Jan. 3, 1933.  J. S. PARSONS  1,893,178
ELECTRICAL DISTRIBUTION SYSTEM
Filed June 27, 1925   5 Sheets-Sheet 1

WITNESSES:

INVENTOR
John S. Parsons.
BY
ATTORNEY

Jan. 3, 1933. J. S. PARSONS 1,893,178
ELECTRICAL DISTRIBUTION SYSTEM
Filed June 27, 1925  5 Sheets-Sheet 2

WITNESSES:
C. J. Weller.
E. R. Evans

INVENTOR
John S. Parsons.
BY
Wesley G. Carr
ATTORNEY

Patented Jan. 3, 1933

1,893,178

UNITED STATES PATENT OFFICE

JOHN S. PARSONS, OF WILKINSBURG, PENNSYLVANIA, ASSIGNOR TO WESTINGHOUSE ELECTRIC & MANUFACTURING COMPANY, A CORPORATION OF PENNSYLVANIA

ELECTRICAL DISTRIBUTION SYSTEM

Application filed June 27, 1925. Serial No. 39,947.

My invention relates to electrical distribution systems and particularly to alternating-current supply systems for metropolitan areas.

One object of my invention is the provision of an improved low-voltage network system comprising a plurality of parallel supply circuits including step-down transformers, a circuit-interrupter between each supply circuit and the low-voltage network, and automatic means for controlling the circuit-interrupter irrespective of the load connected to the network.

Another object of my invention is to provide, in a system of the above-described character, circuit-interrupters between each of a plurality of supply circuits and an inter-connected network, and means responsive to the voltage across and the current traversing each of said circuit-interrupters for controlling the same.

Another object of my invention is to provide an improved network system in which the circuit-interrupters are controlled by relays connected to the supply circuit and to the network, each relay having a plurality of windings so arranged as to actuate the relay in accordance with the direction of the flow of energy traversing the interrupter when it is closed and with the phase relation of the voltages on opposite sides of the interrupter when the interrupter is open.

A further object of my invention is the provision of an improved relay comprising a movable armature member and three windings for actuating the same, said windings being so disposed as to actuate the armature member in accordance with the phase relation of the currents traversing the first and second windings or in accordance with the phase relation of the currents traversing the first and third windings.

Another object of my invention is to provide means for preventing pumping of the network switch or interruper under all conditions. By pumping is meant the periodic closing and opening of the network interrupter in response to certain system conditions.

Other detailed objects of my invention will appear in the following description and in the claims appended thereto.

The importance of continuity of service in metropolitan areas requires the energization of the low-voltage network supplying the load from a plurality of transformers in parallel, in order to prevent the failure or disconnection of a transformer or a supply circuit from interrupting the service to any portion of the load. Such interconnection of transformers possesses other advantages besides that of continuity of service. The diversity of the individual loads improves the load factor of the system and increases the all-day efficiency of the system. Furthermore, since the required transformer and feeder capacity is reduced to a minimum, a considerable saving in the initial investment required is effected.

However, in an interconnected system of this kind, a faulty feeder must be disconnected from the system at both ends. If a short-circuit occurs on one feeder, the usual operation of the switching apparatus in the generating station to disconnect the feeder from the station will not be sufficient, inasmuch as the feeder will be energized from the network by a reversed flow of energy through the transformer. This condition not only overloads the system but energizes the feeder so that repairs cannot be made. Therefore, in addition to the usual circuit-interrupter at the station end of each feeder, a circuit interrupter at the load end of the feeder is required. Preferably, the last mentioned circuit-interrupter is disposed between the secondary winding of the step-down transformer and the network, thus disconnecting both the feeder and the transformer from the network in case a fault develops in either element of the system.

In accordance with my invention, the network interrupter is arranged to open automatically upon a relatively slight reversal of energy and to reclose automatically when the magnitude and phase relations of the voltages across the interrupter are correct. The interrupter may also be arranged to open upon the failure of the voltage of the system. Since the interrupter opens upon a slight reversal of energy, the transformer may be disconnected during periods of light load by opening the station interrupter, thereby causing the transformer to be energized from the network. The reversal of energy caused by the energization of the transformer and feeder from the network results in opening the interrupter and completely isolating the feeder. The other feeders assume the load, so that the transformer and feeder losses in the system are reduced.

In accordance with my invention, the network interrupter is controlled by a relay having a voltage winding, a phasing winding and a current winding. The phasing winding of the relay is energized when the interrupter is open and cooperates with the voltage winding to operatively energize the relay when the voltages on opposite sides of the interrupter are of a predetermined magnitude and phase relation. The current winding of the relay is energized when the interrupter is closed and cooperates with the voltage winding to maintain the relay in its operated position as long as energy traverses the interrupter in the normal direction.

The relay is also provided with a holding winding that is effective during periods of light load to maintain the relay closed. This holding winding constitutes the means for obtaining a reverse-current adjustment and is something different from the relay holding magnet to be described later. It is the so-called holding magnet that provides the anti-pumping or pump-proof feature whereas the so-called holding winding is utilized in the electrical reverse-current adjustment feature. Since the current and phasing windings of the relay are connected to portions of the circuit that are traversed by relatively large currents or subjected to relatively high voltages under certain conditions, means is provided for limiting the currents through the said windings.

For a clearer understanding of my invention, reference should be had to the accompanying drawings, in which.

Figure 1:
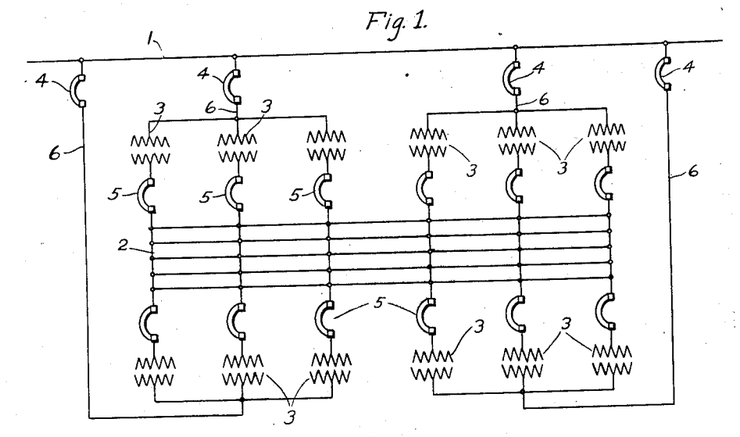
Figure 1 is a diagrammatic view of an alternating-current distribution system in which my invention may be employed.

Referring to Fig. 1, the distribution system shown comprises a high-voltage supply bus 1, which may be the bus bars of a generating station, a low-voltage network 2, which may be that supplying the light and power load of a metropolitan area, and a plurality of parallel step-down transformers 3 between the supply circuit and the network circuit.

A circuit-interrupter 4 is disposed between each group of transformers and the supply bus 1. The circuit-interrupters 4 may be of the manually-controlled type or of the usual overload interrupters arranged to open automatically in case of a short-circuit. Automatic circuit-interrupters 5 are disposed between each transformer 3 and the secondary network 2. The circuit-interrupters 4 are located at the station end of the feeder circuits 6 and the transformers 3 and the circuit-interrupters 5 are located at the load end thereof. The circuit-interrupters 5 are arranged to open automatically in case of the reversal of energy through the associated transformer 3, as would result if the circuit-interrupter 4 were opened, if a fault occurred in the transformer 3 or in the feeder circuit 6. The opening function of the circuit-interrupter 5 is, therefore, responsive to the magnitude and phase position of the current flowing through the interrupter 5.

Figure 5:
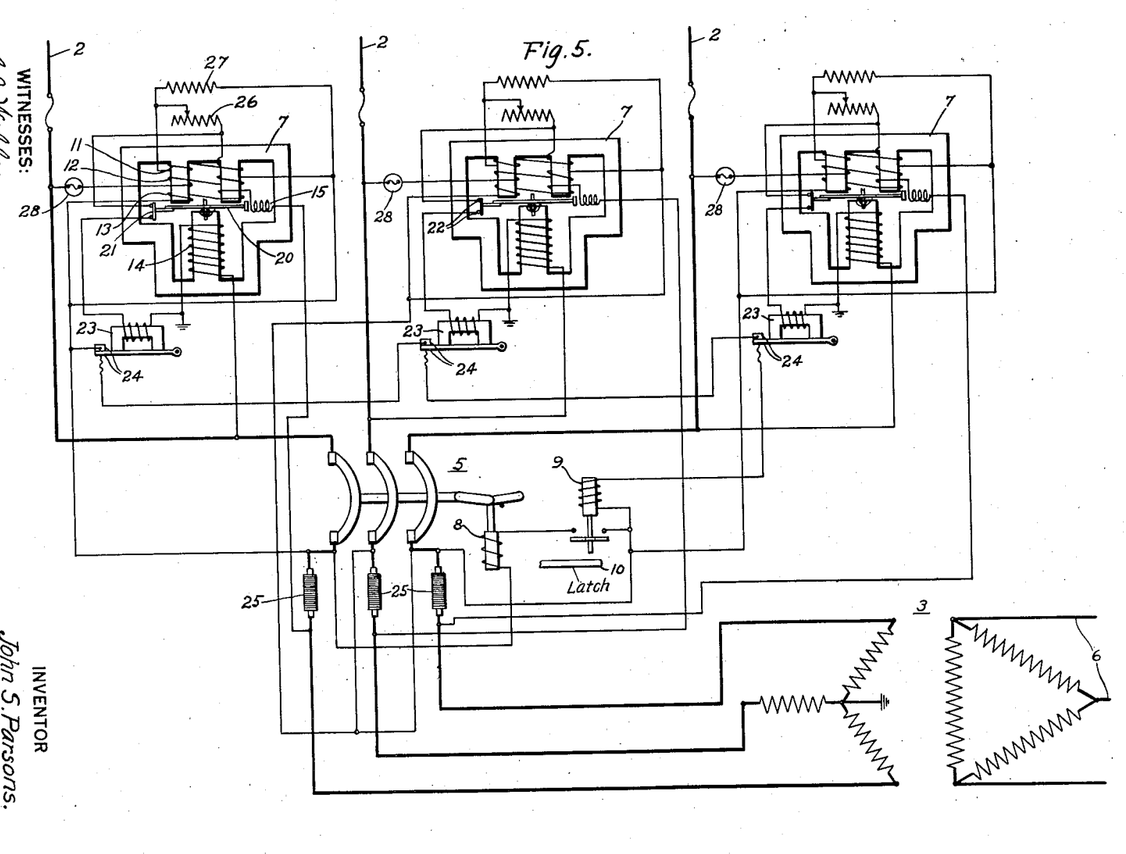
Fig. 5 is a diagrammatic view of a three-phase distribution system embodying my invention and employing the relays shown in Figs. 2 and 3.

As shown in Fig. 5, a three-phase distribution system may include a three-phase transformer 3 connected to the feeder circuit 6, a three-pole circuit-interrupter 5 between said transformer and the load circuit 2 and three control relays 7 controlling the operation of said interrupter. Each of the automatic interrupters 5 in the parallel supply circuits is identical with that shown, and, accordingly, the control circuits of only one interrupter are shown in detail.

The circuit-interrupter 5 may have a closing coil 8 and a low-voltage device 9 adapted to cooperate with a latch member 10 to open the circuit-interrupter, which is normally latched in the closed position. The detailed construction of the circuit-interrupter 5 may be similar to that illustrated in United States Patent No. 1,431,956, issued October 17, 1922, to E. G. Johnson, or may be similar to that illustrated in the copending application of J. B. MacNeill, Serial No. 5175, filed January 27, 1925. Instead of the low-voltage trip type of interrupter, as shown, an interrupter having a shunt-trip device or other suitable trip device may be used.

Figure 2:
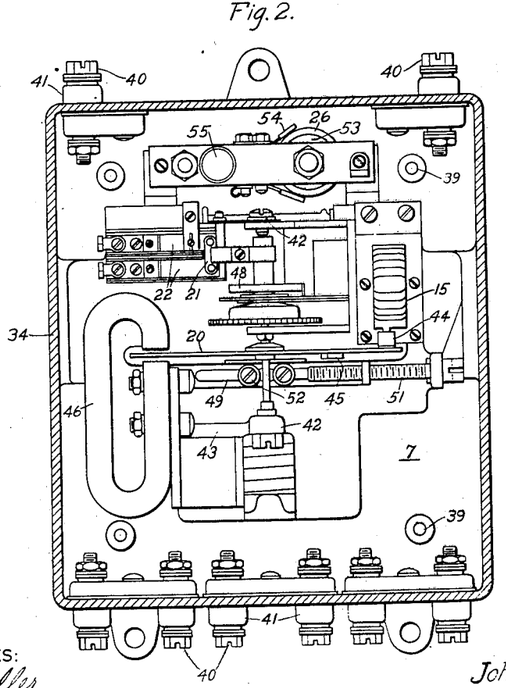
Figs. 2 and 3 are front and side views, respectively, of the relay embodying my invention.
Figure 3:
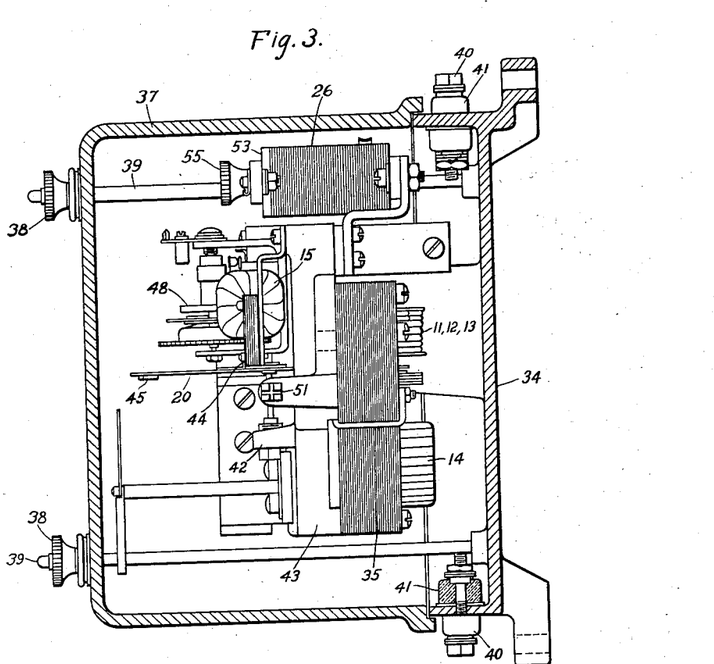
Figure 4:
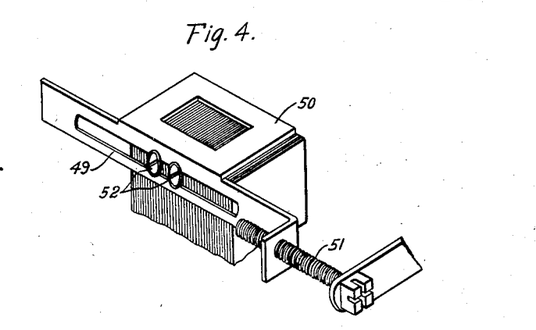
Fig. 4 is a detailed view of an element of the relay shown in Figs. 2 and 3.

The detailed construction of the relay 7 is shown in Figs. 2 to 4, inclusive, and the connections of the relays to the circuit are shown in Fig. 5. Each relay comprises a holding winding 11, a phasing winding 12, a current winding 13 and a voltage winding 14. An auxiliary holding magnet 15 cooperates with the first mentioned windings to control the armature member 20 of the relay to provide the anti-pumping feature. The armature member 20 is provided with a contact member 21 for engaging the stationary contact members 22. An electromagnetic switch 23 is connected in series with the contact members 21 and 22 of the relay. The switch 23 is provided with contact members 24, the contact members of the three switches 23 associated with the interrupter 5 being connected in series with the low-voltage tripping device 9 of said interrupter.

Three reactive shunts 25 are connected in series circuit relation between the terminals of the respective secondary windings of the transformer 3 and the terminals of the circuit interrupter 5. The current windings 13 of the relays 7 are connected across the reactive shunts 25, as shown. The reactive shunts 25 comprise copper bars on which are disposed a plurality of iron discs to provide a laminated core member of limited cross-section.

Inasmuch as the iron discs become saturated at a relatively low value of current, it will be evident that the reactive drop across the shunt is only proportional to the current for relatively small values of current. The energization of the current windings of the relay is, therefore, not proportionately increased when the shunt is traversed by an excessive current. Accordingly, the relays are responsive to relatively small values of current and are not damaged or affected in any way by short-circuits or continuous overloads in the distribution system.

The holding winding 11 of each relay is shunted by a variable resistor 26 and one terminal thereof is connected through a resistor 27 to the feeder circuit between the circuit-interrupter 5 and the transformer 3. The other terminal thereof is connected through the contacts 21 and 22 and the operating coil of the switch 23 to ground. Since the holding winding 11 is connected in series with the contacts 21 and 22 of the relay 7, it is not energized when the circuit interrupter 5 is open. The phasing winding 12 is connected directly across the terminals of the circuit-interrupter 5 and is only energized when said circuit-interrupter is open.

Inasmuch as the voltage across the terminals of the circuit-interrupter may be twice the normal voltage of the circuit, or even greater under certain conditions, a resistor 28, having a large positive temperature coefficient of resistance, is connected in series with the winding 12. The resistor 28 is preferably a tungsten resistor of such size as to become incandescent at the maximum applied voltage. When incandescent, the resistor will have such high resistance as to limit the current through the phasing winding 12, although said winding is operatively energized when only a small voltage obtains across the break contacts of interrupter 5.

Referring to Figs. 2 to 4, inclusive, the relay 7 comprises a base member 34 on which are mounted a core member 35 and the armature member 20 controlled thereby. The elements of the relay are enclosed by a cover 37 which is secured to the base member 34 by threaded thumbnuts 38 engaging cover studs 39 extending through the cover. A series of terminals 40 are mounted on the base member 34 and are insulated therefrom by bushings 41. The terminals 40 are connected to the windings of the relay, the connections being omitted from the drawings for the sake of clearness.

The armature member 20 is pivotally supported in bearings 42 mounted on a frame member 43 that is, in turn, secured to the core member 35 and the base member 34. The edge of the armature member 20 is disposed in the air gap between the opposed pole pieces of the core member 35, as shown in Figs. 3 and 5. The armature member is shown in the closed position in Figs. 2 and 3, the travel of the armature member being limited in one direction by the engagement of a magnetizable armature 44 on the main armature member with the electromagnet 15 and, in the other direction by the engagement of a lug 45 with a stop fastened to frame 43. The bridging contact member 21, cooperating with the stationary contact members 22, is secured to a spindle 21a which is gear driven by the spindle of the armature member 20. The contact member 21 is normally held in engagement with the stationary contact members 22, when the relay is deenergized, by a spring 48. The movement of the armature member 20 is controlled by the restraining spring 48 and by the damping magnet 46.

An adjustable element 49, shown in detail in Fig. 4, is provided for the purpose of adjusting the relative torques exerted by the windings of the relay in order to provide an over-voltage adjustment and comprises a flat plate member 50 disposed in the air gap of the core member 35, adjacent to the armature member 20, and an adjusting screw 51 for moving the plate member to the desired position. The adjusting element is secured in the desired position by the locking screws 52. The plate member 50 is made of copper, or other non-magnetizable metal, and forms a short-circuited single-turn winding or adjustable shade coil in the magnetic circuit of the relay which modifies the torque on the armature member in accordance with its position.

An adjustable resistor 26 is also provided for modifying the reverse-current setting of the relay 7 and is connected, as shown in Fig. 5, in shunt relation to the holding winding 11. The adjustable resistor 26 comprises a coil of high-resistance wire wound on a suitable spool 53 and an adjustable contact member 54 engaging said coil and having screw-threaded engagement with an adjusting screw 55. Transverse movement of the contact member 54 is produced by turning the adjusting screw 55, which is journalled in the frame 43 of the relay, thus providing an adjustment of the resistance in the circuit of the holding winding 11. The element 49 affects the torque exerted by both the holding winding 11 and the current winding 13 simultaneously and the adjustable resistor 26 provides a means for adjusting the relative torques of the two windings, as desired.

When the relay 7 is deenergized, the spring 48 maintains the contact members 21 and 22 in engagement. When the voltage winding 14 and the phasing winding 12 are energized, the direction and magnitude of the torque on the armature member 20 depends upon the phase relation between the currents traversing said windings.

In the system shown in Fig. 5, the voltage and phasing windings are so connected to the circuit as to close the contact members of the relay when the voltages across the interrupter 5 are of such relative magnitude and phase relation that the current which will flow after the interrupter closes will be of such magnitude and phase position as to maintain the interrupter closed under any given set of system conditions.

When the voltage winding 14 and the current winding 13 of the relay are energized, a torque is exerted on the armature member 20 that depends for its direction and magnitude upon the phase relation of the currents in windings 13 and 14. In the system shown in Fig. 5, the current winding 13 is energized as soon as the interrupter 5 is closed, this operation deenergizing the phasing winding 12. However, the torque exerted by the current winding 13 is in such direction as to maintain the contact members of the relay closed as long as the associated interrupter 5 is traversed by energy in the normal direction.

The torque on the armature member 20, when the holding winding 11 is energized, also depends upon the phase relation of the currents in the windings 11 and 14. The current winding 13 is connected in series with the holding magnet 15 and the two windings cooperate, in the system shown in Fig. 5, to hold the contact members of the relay closed so long as the energy traverses the interrupter 5 in the normal direction. The holding magnet 15 exerts a relatively large torque upon the armature member 20 when the load current is appreciable, providing the armature member is in its operated position. If the armature member has been actuated to a position in which the contact members 21 and 22 are disengaged, the holding magnet 15 exerts no torque on the armature member, and the ampere-turns of the magnet are too small when the load current is small to exert an appreciable effect. By reason of the connection of the current winding 13 and the holding magnet 15 across the reactive shunt 25, the said windings may exert substantially the same torque at high values of load current as at ordinary values. However, the holding magnet is substantially non-operative below 25% of normal load, the contact members of the relay being held closed during the periods of light load by the current winding 13 and the holding winding 11 acting together with the voltage winding 14 and the spring 48.

Assuming the circuit-interrupters 4 open and the feeder circuits 6 deenergized, the circuit-interrupters 5 are open. If one of the circuit-interrupters 4 is closed, the transformer or transformers 3 connected thereto are energized and the circuit for energizing the low-voltage device 9 of the circuit-interrupters 5 is closed. This circuit may be traced through the contact members 24 of the electromagnetic switches 23 which are closed as soon as the transformer 3 is energized, since the contact members of the relays 7 are maintained closed by the spring 48 when the network 2 is de-energized. The contact members of the low-voltage device 9 close the circuit of the operating coil 8 of the circuit-interrupter 5. The contact members of the low-voltage device are mechanically opened by the closing of the interrupter 5 thereby interrupting the circuit of the closing coil 8, the interrupter being held closed by suitable latching mechanism. The detailed construction of a suitable switch is disclosed in the above-mentioned patent to E. G. Johnson.

The energization of the closing coil 8 closes the circuit-interrupter 5, thereby connecting the transformer 3 to the work circuit 2. From the foregoing description of the relay 7, it will be clear that the contact members 21, 22 of the relays 7 were initially held in engagement by the springs 48. As soon as any feeder 6 circuit is energized, the phasing windings 12 of the relays 7 associated therewith are energized, as each of these windings is connected to one conductor of the feeder circuit across the break contacts of the circuit interrupter 5. The current traversing the phasing winding 12 is dependent upon the magnitudes and phase relation of the voltages on opposite sides of the open circuit interrupter 5 and, therefore, the contact members 21, 22 of the relays 7 are immediately opened if the voltage on the feeder circuit is so low that energy will not be fed to the work circuit. In the assumed case, the work circuit is deenergized and the phasing winding 12 of each relay 7, though energized, is ineffective on account of the deenergization of the cooperating voltage winding 14. The contact members are held closed by the spring 48.

When the circuit-interrupter 5 is closed, the phasing winding 12 becomes deenergized but the holding winding 11 and the voltage winding 14 are energized, the circuit of the first-mentioned winding including the contact members 21 and 22 of the relay. The torque of the holding winding 11 is augmented by the torque exerted by the current winding 13 and the holding magnet 15, which are connected across the reactive shunt 25, if an appreciable load current traverses the interrupter.

If a fault occurs in the feeder circuit 6, or if the switch 4 is opened, the reversal of energy through the interrupter 5 for feeding the short-circuit or for magnetizing the transformer 3 causes the relays 7 to open their contact members. The reversal of torques on the armature members 20 of the relays results from the reversal of the current through the winding 13 when the flow of energy traversing the interrupter 5 is reversed. The opening of the circuit of any of the electromagnetic switches 23 interrupts the circuit of the low-voltage device 9, and the core member thereof strikes the latch 10 and opens the circuit-interrupter 5. Since the opening of the circuit-interrupter 5 is affected by the deenergization of the low-voltage device 9, it is apparent that failure of the voltage on the entire distribution system will also cause the interrupter to be opened. However, this feature is not essential. It may be omitted, if desired, and an opening coil employed to trip the circuit-interrupter 5.

The operation of the circuit-interrupters 5 and the control relays associated therewith in the circuits that are in parallel with that shown in Fig. 5 is identical with that just described, and, consequently, it is unnecessary to describe the same in detail. If the secondary network 2 is energized through only one of the feeder circuits and the load increases to the point where it is desirable to utilize another feeder circuit, the interrupter 4 in an idle feeder circuit is closed by the station operator. If the magnitudes and phase relation of the voltages on opposite sides of the open circuit-interrupter 5 are correct, the phasing windings 12 of the relays 7 cooperate with voltage windings 14 to maintain the relay contacts closed, thereby closing the interrupter 5, irrespective of the load connected to the system. If the voltage on the feeder circuit is too low or is out of phase, either by reason of the fact that it is generated by a source that is not in synchronism or that, in the course of repairs made on the polyphase feeder, the feeder conductors have been transposed, the phasing windings 12 cooperate with the voltage windings 14 to maintain the contact members of the relays 7 open and thereby prevent the closure of the circuit-interrupter 5. It is apparent that any number of feeder circuits may be operated in parallel, as the operation of the interrupters in the respective circuits is independent of the other interrupters.

In a system of this kind, where an interrupter is automatically opened and reclosed by a single control organization, it is important to guard against the possibility of "pumping" of the interrupter. Since the operation of the control relays 7, when the interrupter is open, is dependent upon the voltage across the interrupter and the operation of the relays 7, when the interrupter is closed, is dependent upon the current traversing the interrupter, it is conceivable that with a transformer and with a load of certain impedance characteristics the energization of the relays may be so changed by the closure of the interrupter that the latter will be opened, thereby causing "pumping" of the interrupter. I have entirely eliminated this possibility by the disposition and connection of the relay windings shown and by the use of the holding magnet 15 which provides a relatively large torque upon the armature member for normal values of current through the interrupter when the contact members are already closed.

Figure 7:
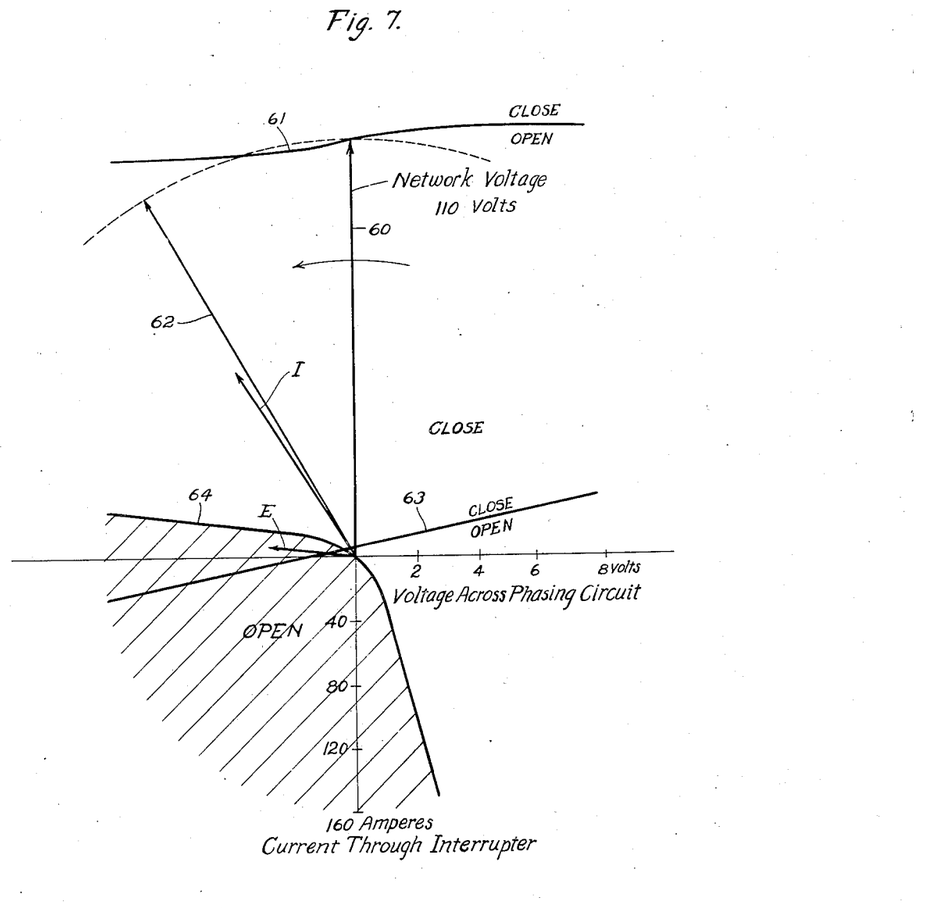
Fig. 7 is a vector diagram illustrating the characteristics of the relay.

In Fig. 7 the characteristics of the relay are represented in a vector diagram. In this diagram, the network voltage and the phasing voltage, or the voltage across the network interrupter, are both represented as having a common origin. Since these vectors are independent quantities the figures in reality is a combination of two vector diagrams.

The vector 60 represents the network voltage and the line 61 is the loci of the corresponding secondary feeder voltages and also phasing voltages at which the relay 7 will just cause the network interrupter 5 to be reclosed. If the feeder voltage vector does not reach the curve 61, the interrupter 5 will remain open. Thus, if we assume that the feeder voltage is represented by the vector 62 and is approximately equal to the network voltage but is 30° out of phase therewith, it is apparent that the network interrupter will not be reclosed. If the voltage is out of phase as much as 30° therefore, it must be much larger than the network voltage or the control relay is actuated to the open position.

The line 63 is the loci of the phasing voltages, or the voltages across the interrupter, at which the interrupter will be reclosed, and corresponds to a small portion of the locus curve 61 taken a few electrical degrees on either side of the point where it meets the network voltage vector 60 extended. It presents an enlarged view of that portion transposed to a lower origin in the figure for convenient reference with respect to the locus 64 of load currents which control the interrupter.

The phasing voltage is represented by the vector E. Obviously, since it is the resultant between the network voltage, as shown by vector 60, and the feeder voltage, as shown by a vector terminating on the closing side of the curve 61, it may occupy a leading or lagging position relative to the network voltage depending upon the relation between the network and the feeder voltages.

When the phasing voltage is of such a value that the vector E will meet or cross the closing curve 63, the feeder voltage is of sufficient value and of proper phase position to cause the network relay 7 to operate to close the interrupter 5. The interrupter will thereupon close.

Now, however, since the usual commercial circuit has such impedance constants that the current in the circuit will ordinarily lag its voltage by an angle somewhere within the range from 15° to 75°, it is necessary to introduce an angle between the phasing voltage curve or closing curve 63 and the current curve or opening curve 64 so that any leading-reversed current caused by lagging phasing voltage will not cross to the opening side of the current curve 64 and cause the interrupter 5 to reopen immediately after being closed. For that reason, to prevent such "pumping" action, the current curve 64 may be modified to introduce an angular separation, preferably about 90°, as illustrated in Fig. 7. Thus, when the switch is closed by a phasing voltage in the upper right-hand quadrant that is, the normal lagging quadrant, the switch will remain closed even though the current which flows after the interrupter 5 closes may lag almost 90 degrees behind the phasing voltage which would be unlikely, however, in a commercial circuit.

Thus, by bending the loci 64 controlling the opening of the circuit interrupter to take care of such a condition, "pumping", or immediate reopening and reclosing of the interrupter, is prevented.

In the present application, the curve 64 is established by the current winding 13 across the shunt 25. Ordinarily, this curve would be a straight line, but, by means of the holding magnet 15, the curve 64 is bent so that the portion adjacent the opening side of the voltage locus 63 is substantially 90 electrical degrees behind that locus to prevent reopening of the main switch 5 on leading reverse currents caused by lagging phasing voltages. Or, stated differently, the curve 64 is bent as shown in Fig. 7 so that the current which flows when the interrupter closes may lag any phasing voltage which produces a closing torque by any angle up to aproximately 90 electrical degrees and yet produce a torque in the relay 7 to maintain the circuit interrupter 5 in the closed position.

The bending of the curve 64 is accomplished by the effects of two different torques in the relays 7, one torque being produced by the current winding 13 cooperating with the voltage winding 14 and the other torque being produced by the holding magnet 15. To explain further:—

The current winding 13 and the voltage winding 14 cooperate when the interrupter 5 is closed and tend to either maintain the interrupter 5 closed or to open it dependent upon the magnitude and phase position of the current traversing the interrupter 5. Thus, if the current is in the normal direction flowing from the transformer 3 to the network 2, the current winding 13 and the voltage winding 14 cooperate to produce a relay torque in a direction to maintain the interrupter 5 closed but if a reverse current occurs, a relay torque will be produced in a direction as to open the interrupter 5.

The holding magnet 15, however, tends to maintain the relay closed regardless of the direction of the current to which it is responsive. The torque exerted to maintain it closed is approximately proportional to the square of the current up to the point of saturation and is independent of the phase position of such current.

The torque exerted by the current winding 13 and the voltage winding 14 cooperating is, however, substantially proportional to the first power of the current up to the point of saturation and is dependent upon the phase position of the current.

It is the cooperation of these two sets of forces or torques relating to the opening function of the interrupter 5 that produce the peculiar shaped opening curve 64 of Fig. 7 and provide the so-called anti-pumping feature which is especially emphasized in this invention.

Figure 6:
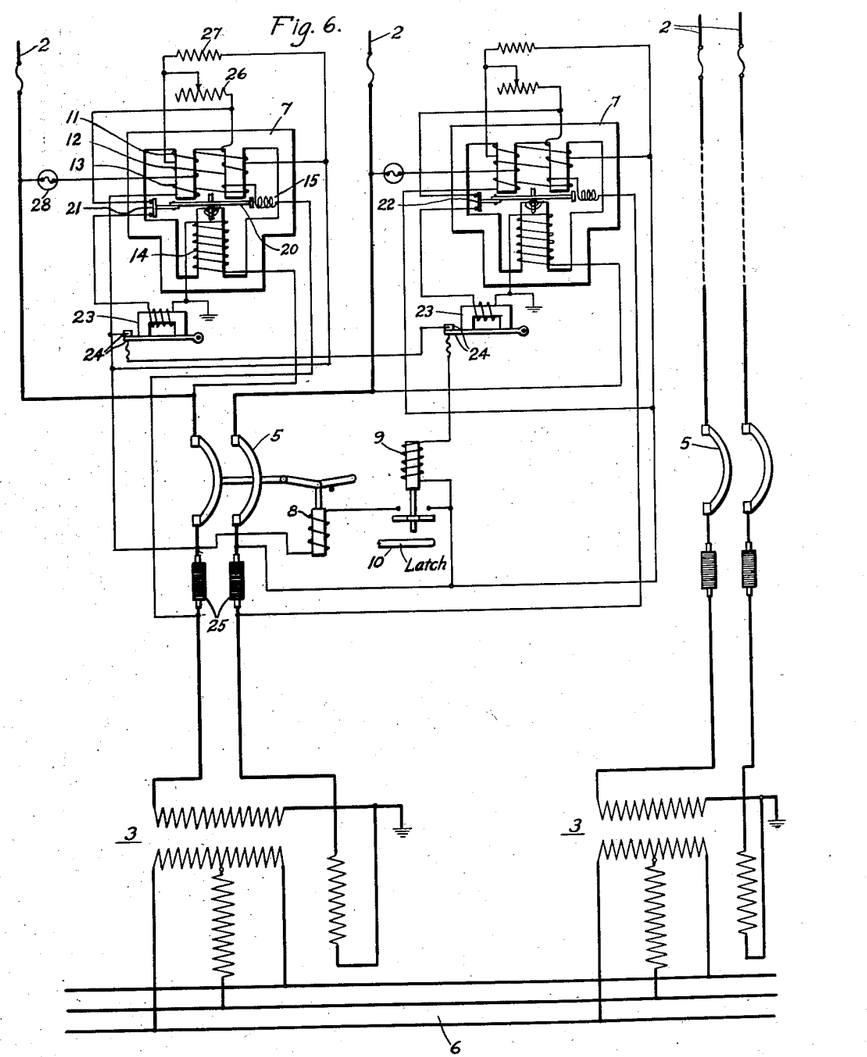
Fig. 6 is a similar view of a two-phase system embodying my invention.

In Fig. 6 is shown a two-phase distribution system of the same general character as the three-phase system shown in Fig. 5. The three-phase supply circuit 6 is connected through the transformers 3 and a plurality of parallel circuit-interrupters 5 to an interconnected low-voltage network. The circuit, interrupters 5 are identical in construction and operation with the circuit interrupter shown in Fig. 5, and the control relays 7 for controlling said interrupters are identical in construction and in their connection to the circuit with the relays shown in Fig. 5. One relay 7 is provided for each of the main circuit conductors connected to the terminals of the secondary winding of the transformer 3. Since the operation of the system shown in Fig. 6 is identical with that shown in Fig. 5, it is unnecessary to describe the same in detail, the system being shown to illustrate the adaptability of the described apparatus to the various types of distribution systems.

The embodiments of my invention that I have described herein should be interpreted in an illustrative and not in a limiting sense, as many modifications will occur to those skilled in the art. Accordingly, I do not wish the scope of my invention to be limited, except as may be indicated in the appended claims.

I claim as my invention:

1. An alternating-current distribution system including a plurality of supply circuits, a plurality of transformers connected to said circuits, a work circuit connected to the secondary windings of said transformers, circuit-interrupters associated with said transformers, means including a relay controlling each interrupter, said relay having an electrical reverse-current adjustment means and including a plurality of windings cooperatively energized when the associated interrupter is closed and another winding operatively energized when said interrupter is open.

2. An alternating-current distribution system including a plurality of polyphase supply circuits, a plurality of transformers connected in parallel to said circuits, a work circuit connected to the secondary windings of said transformers, circuit interrupters between said work circuit and the secondary windings of said transformers, means including a relay controlling each interrupter to open the same upon a reversal of the flow of current therethrough, said relay having a plurality of windings, including an electrical reverse-current adjustment means, cooperatively energized when said interrupter is closed.

3. An alternating-current distribution system including a plurality of feeders, a transformer in each feeder, a work circuit connected to said transformers, a circuit-interrupter between each transformer and said work circuit, and a relay embodying a voltage winding, a phasing winding, a holding winding and a current winding for controlling one of said interrupters, said phasing winding being operative when said interrupter is open and said current winding and holding winding being operative when said interrupter is closed.

4. An alternating-current distribution system including a plurality of feeders, a transformer in each feeder, a work circuit connected to said transformers, a circuit-interrupter between each transformer and said work circuit, means including a relay embodying four windings and an armature member actuated in accordance with the phase relations of the currents traversing said windings for controlling one of said interrupters, the first and second of said windings being operative when said interrupter is open and the first, third and fourth of said windings being operative when said interrupter is closed.

5. An alternating-current distribution system including a plurality of feeders, a transformer in each feeder, a work circuit connected to said transformers, a circuit-interrupter between each transformer and said work circuit, and a relay embodying four windings and an armature member actuated in accordance with the phase relations of the currents traversing said windings for controlling one of said interrupters, one of said windings being energized in accordance with the current traversing said interrupter and another of said windings being energized in accordance with the voltage across the break contacts of said interrupter.

6. An alternating-current distribution system including a circuit supplying a load, a circuit-interrupter therein and means including a relay controlling said interrupter, said relay embodying a plurality of windings including an electrical reverse-current adjustment means operatively energized when said interrupter is closed and another of said windings operatively energized when said interrupter is open.

7. An alternating-current distribution system including a circuit supplying a load, a circuit-interrupter therein and means including a relay controlling said interrupter, said relay embodying four windings and an armature member actuated in accordance with the phase relations of the currents traversing said windings, the first and second of said windings being operative when said interrupter is open and the first, third and fourth of said windings being operative when said interrupter is closed.

8. An alternating-current distribution system including a circuit supplying a load, a circuit-interrupter therein and means including a relay controlling said interrupter, said relay embodying four windings and an armature member actuated in accordance with the phase relations of the currents traversing said windings, one of said windings being energized in accordance with the current traversing said interrupter when it is closed and another of said windings being energized in accordance with the voltage across the break contacts of said interrupter when it is open.

9. The combination with an alternating-current load circuit and a supply circuit therefor, of a circuit-interrupter between the two circuits and means for controlling the circuit-interrupter including a relay embodying means for closing the interrupter when the supply circuit is in energy-delivering condition relative to the load circuit, means for opening the interrupter upon the occurrence of energy reversal or energy transmission from the load circuit to the supply circuit and means for precluding the operation of the opening means when a leading reverse-current flows through the interrupter.

10. The combination with an alternating-current load circuit, a supply circuit therefor and a switch for connecting and disconnecting the two circuits, of relay means for controlling the operation of the switch to close the switch when the supply circuit is in energy-delivering condition relative to the load circuit and to open the switch when the load circuit is in energy-delivering condition relative to the supply circuit, and additional means constituting part of said relay means for preventing the relay means from opening the switch when a leading reverse current flows therethrough.

11. An alternating-current-distribution system including a plurality of feeders, a transformer in each feeder, a work circuit connected to said transformers, a circuit interrupter between each transformer and said work circuit, and circuit-interrupter-controlling means including a relay means having an over-voltage adjustment means and having means including a variable impedance for adjusting the value of reverse current required to operate the relay means independently of the overvoltage-adjustment means.

12. The combination with a circuit-interrupter for connecting a supply source with a load circuit, of interrupter control means including means for closing the circuit-interrupter dependent upon the magnitude and phase position of the voltage across the interrupter when it is open, and means for opening said interrupter dependent upon the magnitude and phase position of the current flowing through it when it is closed; said control means being characterized that the angle between its opening and closing characteristics on the lead side of the network voltage vector is less than the phase angle between the voltage across the open interrupter and the current which will flow through the interrupter after it closes, and the angle between its opening and closing characteristics on the lag side of the network voltage vector is greater than the phase angle between the voltage across the open interrupter and the current which will flow through the interrupter after it closes.

13. The combination with a plurality of transformers connected to a plurality of feeders for supplying a load circuit, of an interrupter between each transformer and the load circuit and interrupter control means including means for closing the interrupter only when the voltage across the break contacts of said interrupter will cause a current to flow after the interrupter closes which will maintain it closed, said closing being dependent upon the magnitude and phase characteristics of the voltage across the interrupter when it is open, and means for opening said interrupter dependent upon the magnitude and phase characteristics of the current flowing through it when it is closed; said control being characterized that the angle between its opening and closing characteristics on the lead side of the load circuit voltage vector is less than the phase angle between the voltage across the open interrupter and the current which will flow through the interrupter after it closes, and the angle between its opening and closing characteristics on the lag side of the load circuit voltage vector is greater than the angle between the voltage across the open interrupter and the current which will flow through the interrupter after it closes.

14. The combination with a plurality of transformers connected to a plurality of feeders for supplying a load circuit, of an interrupter between each transformer and the load circuit and interrupter control means associated with each interrupter including means for closing the circuit-interrupter dependent upon the magnitude and phase position of the voltage across the open interrupter when said voltage either leads or lags the voltage on the load side of the interrupter, means for preventing the opening of the interrupter on any current which flows after the interrupter closes which is caused by the voltage which existed across the interrupter before it closed, and means for tripping the interrupter on any lagging reverse current of appreciable magnitude.

15. The combination with a plurality of feeders for supplying a load circuit and a circuit-interrupter in each feeder, of interrupter control means including means for closing the circuit-interrupter dependent upon the magnitude and phase position of the voltage across the open interrupter when said voltage either leads or lags the voltage on the load side of the interrupter, means for preventing the opening of said interrupter on any leading reverse current which leads the voltage on the load side of the interrupter by an appreciable angle, and means for opening said interrupter on any lagging reverse current of appreciable magnitude.

16. In combination; a plurality of feeders for supplying energy to a load circuit, a transformer in each feeder, a circuit-interrupter between each transformer and said load circuit, and interrupter control means including means for closing the interrupter dependent upon the magnitude and phase position of the voltage across the interrupter when it is open, and means for opening the interrupter dependent upon the magnitude and phase position of the current flowing through it when it is closed; said control means being characterized that the angle between its opening and closing characteristics on the lead side of the network voltage vector is less than the phase angle between the voltage across the open interrupter and the current which will flow through the interrupter after it closes, and the angle between its opening and closing characteristics on the lag side of the network voltage vector is greater than the phase angle between the voltage across the open interrupter and the current which will flow through the interrupter after it closes.

17. In combination; a plurality of feeders for supplying energy to a load circuit, a transformer in each feeder, a circuit-interrupter between each transformer and said load circuit, and interrupter control means including means for closing the interrupter dependent upon the magnitude and phase position of the voltage across the interrupter when it is open, and means for opening the interrupter dependent upon the magnitude and phase position of the current flowing through it when it is closed; said control means being of such character that the angle between its opening and closing curves on the lead side of the network voltage vector is less than 20° and the angle between the opening and closing curves on the lag side of the network voltage vector is approximately 90°.

18. In combination, two electric circuits, a switch connecting said circuits, and a control relay responsive to a minimum reverse power value which varies with the voltage of the interconnected circuits when said switch is closed and responsive to the phase relation between the voltages of said circuits when said switch is open including means for producing a restraining torque in said relay which varies with the voltage of said circuits and is operative while said switch is closed.

19. In combination, two electric circuits, a switch connecting said circuits, and a combined power directional and phasing relay responsive to power flow between said circuits in a predetermined direction when said switch is closed and responsive to a predetermined phase relation between the voltages of said circuits when said switch is open including two windings arranged to produce a restraining torque which varies with the voltage of said circuits, and contacts in the circuit of one of said windings so that said windings produce said restraining torque when said switch is closed.

20. In combination, two electric circuits, a switch connecting said circuits, and a combined power directional and phasing relay responsive to power flow between said circuits in a predetermined direction when said switch is closed and responsive to a predetermined phase relation between the voltages of said circuits when said switch is open including a voltage winding, a current winding, a restraining winding, and a circuit for said restraining winding across one of said electric circuits.

21. In combination, an electric circuit, and relay means responsive to a minimum reverse power value which varies with the voltage of the said circuit including cooperating voltage windings respectively energized from said circuit for producing a restraining torque in opposition to the torque produced by a reversal of power.

22. In combination, a polyphase circuit, and relay means responsive to a minimum reverse power value which varies with the voltage of said circuit including a plurality of reverse power elements respectively associated with different phases of said circuit, each element including a voltage winding responsive to the voltage of the associated phase, a current winding responsive to the current in the associated phase and a restraining winding energized from the associated phase.

23. In combination, a polyphase circuit and reverse power relay means connected in said circuit and including a plurality of torque producing means respectively energized in response to the power in different phases of said circuit, each of said torque producing means including two voltage windings responsive to the voltage of each phase of said circuit whereby different values of reverse power are required to effect the operation of said relay when the voltage of said circuit varies.

24. In combination, two electric circuits, a switch connecting said circuits and relay means responsive to the power flow between said circuits when said switch is closed and to a predetermined phase relation between corresponding phase voltages of said circuits when said switch is open including means for producing a restraining torque in said relay which varies with the voltage of one of said circuits when said switch is closed.

In testimony whereof, I have hereunto subscribed my name this 26th day of June, 1925.

JOHN S. PARSONS.